United States Patent
Huang et al.

(10) Patent No.: US 9,901,998 B2
(45) Date of Patent: Feb. 27, 2018

(54) BANDSAW MACHINE HEALTH MONITORING SYSTEM

(71) Applicant: COSEN MECHATRONICS CO., LTD., Hsinchu (TW)

(72) Inventors: Mu-Shui Huang, Hsinchu (TW); Jay Lee, Cincinnati, OH (US); Ying-Fan Wu, Hsinchu (TW); Hung-Chang Chang, Hsinchu (TW); Hung-Lung Chung, Hsinchu (TW); Hsiang Huang, Hsinchu (TW); Peng-Yu Huang, Hsinchu (TW); Hung-An Kao, Hsinchu (TW); Shan Hu Yang, Cincinnati, OH (US); Wen Jing Jin, Cincinnati, OH (US); Chih-Chun Cheng, Hsinchu (TW); Ping-Chun Tsai, Hsinchu (TW)

(73) Assignee: COSEN MECHATRONICS CO., LTD., Hsinchu (TW)

( * ) Notice: Subject to any disclaimer, the term of this patent is extended or adjusted under 35 U.S.C. 154(b) by 401 days.

(21) Appl. No.: 14/698,092

(22) Filed: Apr. 28, 2015

(65) Prior Publication Data

US 2015/0309061 A1    Oct. 29, 2015

(30) Foreign Application Priority Data

Apr. 29, 2014  (TW) .............................. 103115391 A
Sep. 2, 2014   (TW) .............................. 103130274 A

(51) Int. Cl.
*B23D 55/00*   (2006.01)
*G07C 3/00*    (2006.01)
(Continued)

(52) U.S. Cl.
CPC ............... *B23D 55/00* (2013.01); *G01M 7/00* (2013.01); *G07C 3/00* (2013.01); *B23Q 17/0995* (2013.01)

(58) Field of Classification Search
CPC ........ B23D 55/00; B23D 57/00; B23D 59/00; B23D 59/001–59/002; B23Q 17/0995; G07C 3/00; G01M 7/00
See application file for complete search history.

(56) References Cited

U.S. PATENT DOCUMENTS 3,793,627 A   2/1974   Darrel et al.
4,087,801 A   5/1978   Noh
(Continued)

FOREIGN PATENT DOCUMENTS

CN   101138884 A   3/2008
CN   102129239 A   7/2011
(Continued)

OTHER PUBLICATIONS

Magno et al., Low-Power Wireless Accelerometer-Based System for Wear Detection of Bandsaw Blades, 2013 IEEE, pp. 630-635.*

*Primary Examiner* — Toan Le
(74) *Attorney, Agent, or Firm* — WPAT, PC

(57) ABSTRACT

A bandsaw machine health monitoring system includes a sensing module, a signal processing module, a human-machine interface module and a control module. The sensing module may include a plurality of sensing devices and these sensing devices can collect a plurality of signals from a bandsaw machine in operation. The signal processing module can be electrically connected to the sensing module and the signal processing module can process the signals collected by the sensing module. The control module can analyze the processing result transmitted from the signal processing module. The human-machine interface module can receive the analysis result of the control module and display the health status value of the bandsaw machine.

20 Claims, 7 Drawing Sheets

(51) Int. Cl.
*G01M 7/00* (2006.01)
*B23Q 17/09* (2006.01)

(56) References Cited

U.S. PATENT DOCUMENTS

| | | |
|---|---|---|
| 4,442,494 A | 4/1984 | Fromson et al. |
| 6,772,034 B1 | 8/2004 | Shi et al. |

FOREIGN PATENT DOCUMENTS

| | | |
|---|---|---|
| CN | 202948288 U | 5/2013 |
| CN | 103558822 A | 2/2014 |
| CN | 203460001 | 3/2014 |
| JP | H09259178 A | 10/1997 |
| JP | 2005235070 A | 9/2005 |
| KR | 101373473 B1 | 3/2014 |
| TW | 571858 | 1/2004 |
| TW | 586978 | 5/2004 |
| TW | M397300 | 2/2011 |
| TW | 201347882 | 12/2013 |

\* cited by examiner

BANDSAW MACHINE HEALTH MONITORING SYSTEM

CROSS-REFERENCE TO RELATED APPLICATION

This application claims the benefit of Taiwan Patent Application No. 103115391, filed on Apr. 29, 2014, and Taiwan Patent Application No. 103130274, filed on Sep. 2, 2014 in the Taiwan Intellectual Property Office, the disclosures of which are incorporated herein in its entirety by reference.

BACKGROUND OF THE INVENTION

1. Field of the Invention

The present invention generally relates to a bandsaw machine health monitoring system, in particular to a bandsaw machine health monitoring system capable of detecting various signals generated during a bandsaw machine is in operation, and transferring the above signals into the health status value of the bandsaw machine by means of an extraction process and a transferring process, etc.

2. Description of the Related Art

Bandsaw machine is one of the most frequently used machine tools, which is for a smith or carpenter to perform a machining operation. However, with the increase of the number of the workpieces processed by the bandsaw machine, the saw blade of the bandsaw machine will gradually wear away; therefore, the user should replace the saw blade periodically so as to make sure the bandsaw machine can work normally. Generally speaking, the user can only rely on his own experience to determine when to replace the saw blade; for the reason, the user cannot accurately know the real health status of the saw blade. If the user fails to learn the saw blade is seriously damaged and still uses the damaged saw blade to perform the machining operation, the damaged saw blade may break into pieces during a machining operation, which may seriously damage the material processed by the bandsaw machine or influence the production line. Similarly, other components of the bandsaw machine also tend to gradually wear away; however, there is, currently, no way for the user to learn the health statuses of these components.

Besides, after the handsaw machine has been used for a long time, there may be a large amount of chips accumulated on the saw blade of the handsaw machine; thus, it is necessary to periodically to clean the chips by a wire brush; however, the wire brush is inclined to wear away; hence, it is necessary to adjust the position of the wire brush to make sure it can completely touch the saw blade in order to effectively clean the chips on the saw blade. Similarly, the user can only rely on his own experience to determine when to adjust the position of the wire brush.

As described above, there is no machine capable of effectively determining whether the health status of a saw blade is good and whether the position of a wire brush is correct. Thus, it has become an important issue to provide a machine capable of determining whether the health status of a saw blade is good and whether the position of a wire brush is correct.

SUMMARY OF THE INVENTION

Therefore, it is one of the primary objectives of the present invention to provide handsaw machine health monitoring system able to effectively determine the health status of each component of a handsaw machine and accurately monitor the position of the wire brush.

To achieve the foregoing objective, the present invention provides a handsaw machine health monitoring system, and the system may include a sensing module, a signal processing module, a human-machine interface module and a control module. The sensing module may include a plurality of sensing devices, wherein the sensing devices may be operable to collect a plurality of signals of a handsaw machine when the handsaw machine is in operation. The signal processing module may be electrically connected to the sensing module, wherein the signal processing module may be operable to receive the signals collected by the sensing module and analyze the signals. The control module may be operable to receive, compare and analyze the processing result of the signal processing module. The human-machine interface module may be operable to receive the analysis result of the control module and display the health status value of the handsaw machine.

In a preferred embodiment of the present invention, the sensing module may further include at least one vibration sensing device, and the vibration sensing device may be installed on the first sliding device and the second sliding device of the bandsaw machine in order to measure the vibration signal generated during the saw blade is performing a machining operation.

In a preferred embodiment of the present invention, the sensing module may further include at least two sound sensing devices, and the sound sensing devices may be respectively installed on the top of the chip cleaning device and on the upper right side of the first driving device of the bandsaw machine in order to measure sound signals generated during the chip cleaning device is cleaning chips and when the saw blade of the bandsaw machine contacts the first driving device.

In a preferred embodiment of the present invention, the sensing module may further include a plurality of temperature sensing devices, and the temperature sensing devices may be respectively installed outside the gear box of the bandsaw machine, and inside the hydraulic tank of the hydraulic device of the bandsaw machine in order to measure the temperatures of the gear box and the hydraulic tank.

In a preferred embodiment of the present invention, the sensing module may further include a flow velocity sensing device, and the flow velocity sensing device may be installed on the cutting fluid main pipe of the cooling device of the bandsaw machine in order to monitor the flow velocity of the cutting fluid main pipe.

In a preferred embodiment of the present invention, the sensing module may further include a pressure sensing device, and the pressure sensing device may be installed on the hydraulic pump of the hydraulic device of the bandsaw machine in order to measure the machining pressure signal.

In a preferred embodiment of the present invention, the health status value may stand for the health status of the saw blade of the bandsaw machine.

In a preferred embodiment of the present invention, the health status value may stand for the health status of the chip cleaning device of the bandsaw machine.

In a preferred embodiment of the present invention, the health status value may stand for the health status of a gear box, a cooling device, a hydraulic device, or a power supply device.

In a preferred embodiment of the present invention, the signal processing module may include a signal segmentation module, a feature extraction module and a feature selection module; the signal segmentation module may partition each of the signals collected by the sensing devices into a plurality of signal segments, and extract one of the signal segments as a feature segment; then the feature extraction module may extract a plurality of signal features from the feature segments, and the feature selection module may select a plurality of major signal features from the signal features.

In a preferred embodiment of the present invention, the signal segmentation module may partition each of the signals into a plurality of signal segments, and the signal segments may include at least one empty cutting segment and at least one real cutting segment; the signal segmentation module may extract the stable segments from the signal segments as the feature segments.

In a preferred embodiment of the present invention, the signal features may include a plurality of time-domain signal features and a plurality of frequency-domain features.

In a preferred embodiment of the present invention, the feature extraction module may partition the frequency spectrum of each of the feature segments into a plurality of frequency spectrum segments, and then calculate the energy weight of each of the frequency spectrum segments to generate the frequency-domain features.

In a preferred embodiment of the present invention, the feature selection module may calculate the correlation coefficient of each of the frequency-domain features and the correlation coefficient of each of the time-domain features, and then select a predetermined number of the time-domain signal features and frequency-domain features with higher correlation coefficients as the major signal features.

To achieve the foregoing objective, the present invention provides a bandsaw machine health monitoring system, and the system may include a sensing module, a signal processing module, a human-machine interface module and a control module. The sensing module may include a plurality of sensing devices, wherein the sensing devices may be operable to collect a plurality of signals during a bandsaw machine is in operation. The signal processing module may be electrically connected to the sensing module, wherein the signal processing module may include a signal segmentation module, a feature extraction module and a feature selection module; the signal segmentation module may partition each of the signals collected by the sensing devices into a plurality of signal segments, and extract one of the signal segments as a feature segment; then the feature extraction module may extract a plurality of signal features from the feature segments, and the feature selection module may select a plurality of major signal features from the signal features. The control module may be operable to receive the major signal features and perform a transferring process to transfer the major signal features selected by the feature selection module into the health status value of the bandsaw machine. The human-machine interface module may be operable to receive the health status value from the control module and then display the health status value.

In a preferred embodiment of the present invention, the control module may collect the health status value of the saw blade after the saw blade performs a machining operation each time, and then establish a future health status estimation model by means of linear regression according to the health status values.

In a preferred embodiment of the present invention, the control module may further calculate the residual machining times of the saw blade according to the future health status estimation model.

In a preferred embodiment of the present invention, the bandsaw machine health monitoring system may further include a forewarning module operable to issue a forewarning signal according to the residual machining times of the future health status estimation model.

In a preferred embodiment of the present invention, the signals may further include one or more of a flow velocity signal, a saw blade tension signal, a pH value signal, a pressure signal, a temperature signal, a turbidity signal and a current signal.

In a preferred embodiment of the present invention, the signals may be sound signals; the control module may transfer the major signal features into the usage status value of the chip cleaning device of the bandsaw machine by means of the transferring process in order to determine the position of the chip cleaning device.

As described above, the bandsaw machine health monitoring system according to the present invention has the following advantages:

(1) One embodiment of the present invention discloses a system able to transfer the signals detected from the bandsaw machine in operation into the health status value of the saw blade of the bandsaw machine by means of the signal segmentation process, the feature extraction process and the feature transferring process, etc. Therefore, the system allows the user to exactly know the abrasion level of the saw blade, so the user can control the timing to replace it, which is very convenient for the user.

(2) One embodiment of the present invention further establishes the future health status estimation model of the saw blade to estimate its residual machining times and then notify the user of which by a forewarning signal, which allows the user to exactly understand the remaining service life of the saw blade.

(3) One embodiment of the present invention calculates the usage status value of the chip cleaning device of the bandsaw machine by analyzing the sound signals so as to determine the position of the chip cleaning device, which provides the user with the information about whether the chip cleaning device exactly touches the saw blade or not.

(4) One embodiment of the present invention uses the above methods to provide the user with the information about the health statuses of other components of the bandsaw machine in addition to the saw blade, which can help the user more efficiently maintain the bandsaw machine.

(5) One embodiment of the present invention extracts the frequency-domain signal features by calculating the energy weight of each of the frequency spectrum segments; in this way, the measurement result will not be influenced by the machining parameters; therefore, the measurement result can be of high precision.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
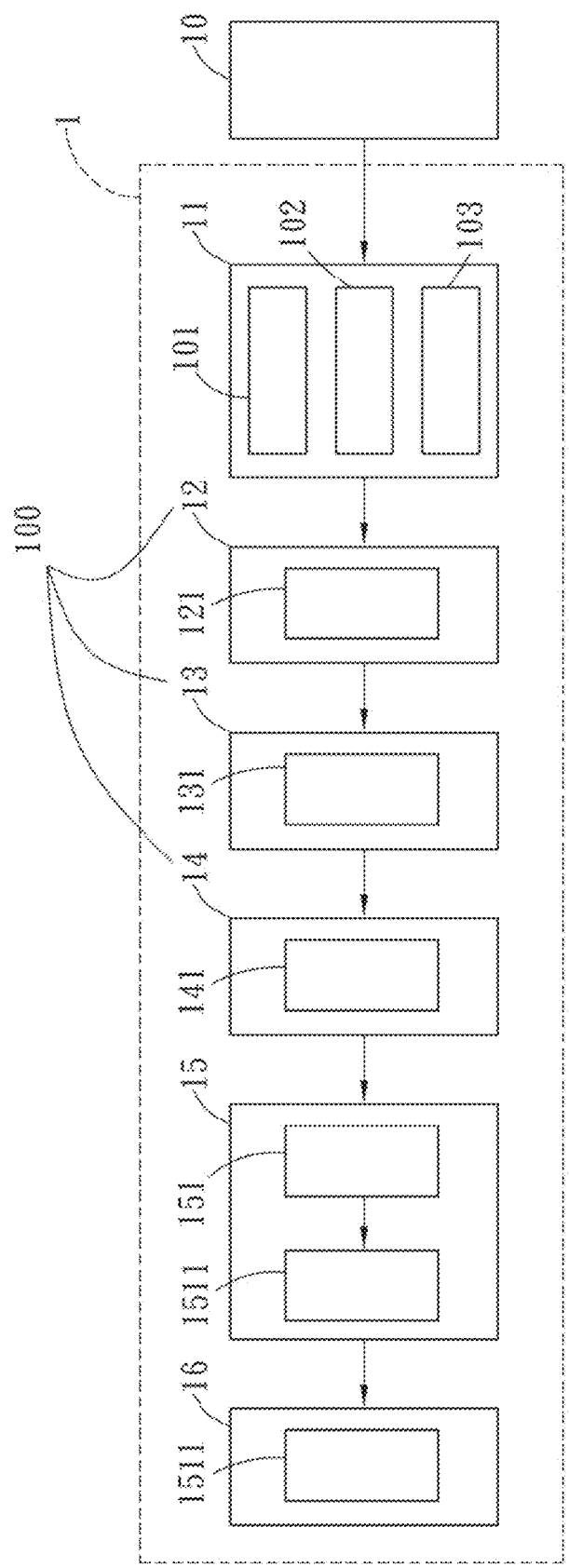
FIG. 1 is the block diagram of the bandsaw machine health monitoring system in accordance with the present invention.

Please refer to FIG. 1, which is the block diagram of the bandsaw machine health monitoring system in accordance with the present invention. As shown in FIG. 1, the bandsaw machine health monitoring system 1 may include a sensing module 11, signal processing module 100, a control module 15 and a human-machine interface module 16, wherein the signal processing module 100 may include a signal segmentation module 12, a feature extraction module 13 and a feature selection module 14.

The sensing module 11 can detect the operation status of the bandsaw machine 10 by means of a plurality of sensing devices disposed on the different parts of the bandsaw machine 10 in order to acquire a plurality of signals 101, 102 and 103. These signals 101, 102 and 103 may include vibration signal or further include sound signal, flow velocity signal, saw blade tension signal, pH value signal, pressure signal, temperature signal, turbidity signal and current signal for the purpose of respectively analyzing the health statuses of all components of the handsaw machine 10. For example, the vibration signal can be used to analyze the health status of the saw blade; the sound signal can be used to analyze the health status of the chip cleaning device, such as the wire brush; the flow velocity signal can be used to analyze the health status of the cooling device, such as the cutting fluid main pipe; the pH value signal can be used to analyze the health status of the cutting fluid; the pressure signal can be used to analyze the health status of the hydraulic device, such as the oil hydraulic pump; the temperature signal can be used to analyze the health status of the gear box, such as the deceleration box, and the hydraulic device, such as the hydraulic tank; the turbidity signal can be used to analyze the health status of the hydraulic device, such as hydraulic oil, and the cooling device, such as the cutting fluid; the current signal can be used to analyze the health status of the power supply device, such as the motor.

Next, the signal segmentation module 12 can execute the signal segmentation and extraction process 121 to respectively partition the signals 101, 102 and 103 into a plurality of signal segments, and then select the most stable signal segments as the feature segments.

The feature extraction module 13 can execute the feature extraction process 131 to acquire a plurality of signal features from the frequency-domain and time-domain of these feature segments in order to acquire a plurality of signal features. Specifically, the feature extraction process 131 for frequency-domain may respectively partition the frequency spectrum of each of the feature segments into a plurality of frequency spectrum segments, and then calculate the frequency-domain feature of each of the frequency spectrum segments; the feature extraction process 131 for time-domain may calculate the mean value, the root mean square, the kurtosis and the skewness, etc., of each of the feature segments, which can serve as the time-domain signal features. The feature selection module 14 can execute the feature selection process 141 to select a plurality of major signal features from these frequency-domain feature and time-domain signal features.

Consequently, the control module 15 can transfer the major signal features selected by the feature selection module 14 into the health status value 1511 of each of the components of the bandsaw machine 10 by the transferring process 151 in order to show their health statuses, and which will be displayed on the human-machine interface module 16. For instance, the health status value 1511 may stand for the health status of some components of the handsaw machine 10, such as the saw blade, the chip cleaning device (e.g. the wire brush), the gear box (e.g. the deceleration box), the cooling device (e.g. the cutting fluid and the cutting fluid main pipe), the hydraulic device (e.g. the hydraulic pump, hydraulic tank and hydraulic oil) or the power supply device (e.g. the motor).

It is particularly noteworthy that there is not, currently, any machine capable of precisely estimating the health statuses of the saw blade or other components of a handsaw machine for the user to determine whether it is time to maintain the machine or replace the damaged components. However, the bandsaw machine health monitoring system according to the present invention can estimate the health status value of each of the components of the bandsaw machine by detecting its operation status; therefore, the system can effectively provide the user with the usage statuses of the saw blade and other components for the user to determine whether to maintain the bandsaw machine or replace the damaged components.

Figure 2:
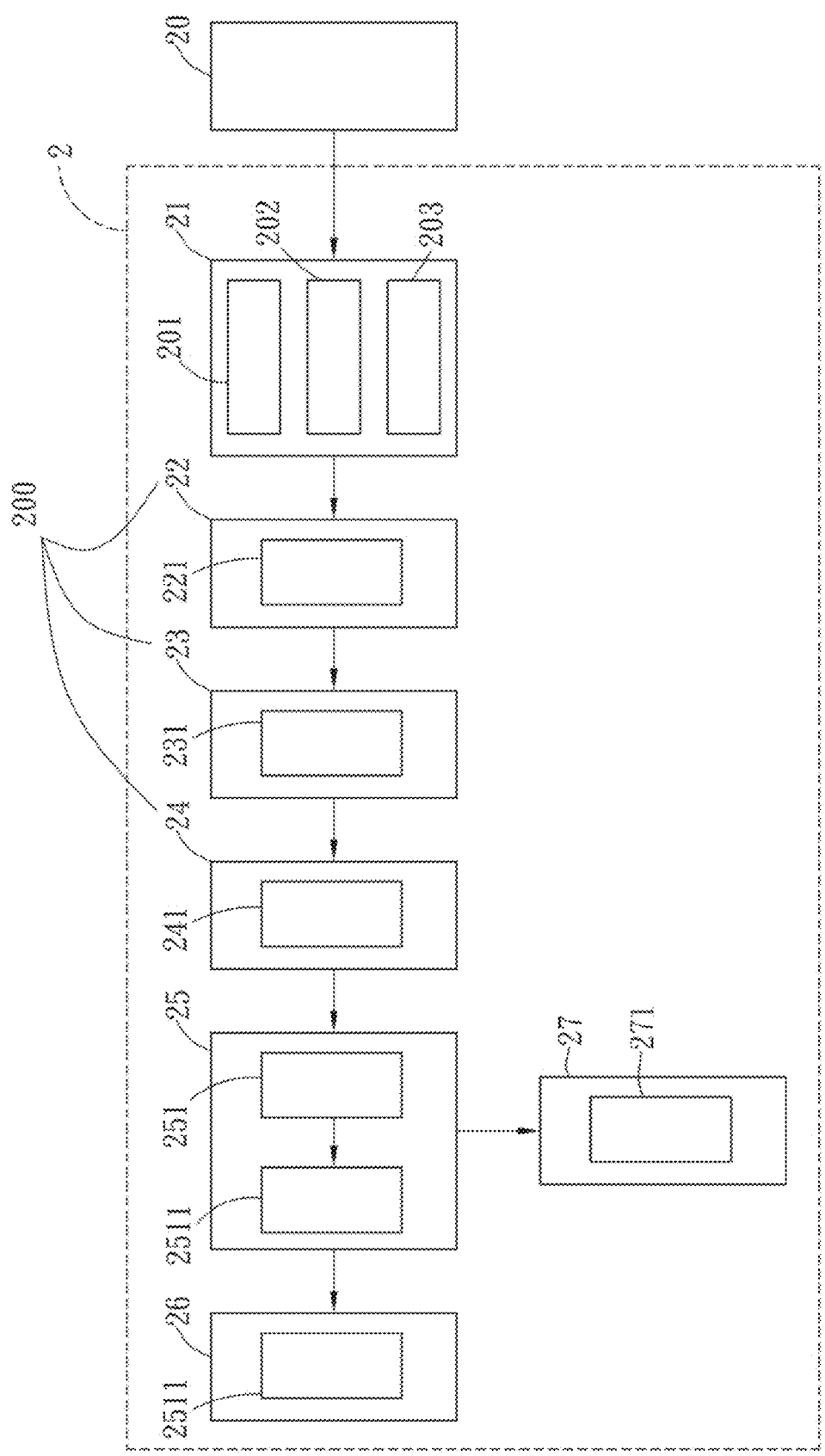
FIG. 2 is the block diagram of the bandsaw machine health monitoring system of the first embodiment in accordance with the present invention.

Please refer to FIG. 2, which is the block diagram of the bandsaw machine health monitoring system of the first embodiment in accordance with the present invention. As shown in FIG. 2, the bandsaw machine health monitoring system 2 may include a sensing module 21, a signal processing module 200, a control module 25, a human-machine interface module 26 and a forewarning module 27, wherein the signal processing module 200 may include a signal segmentation module 22, a feature extraction module 23 and a feature selection module 24.

When the bandsaw machine 20 is performing a machining operation, the sensing module 21 can detect the vibration generated from the bandsaw machine 20 via multiple sensing devices installed on the bandsaw machine 20 to obtain a plurality of vibration signals 201, 202, 203, which can be used to analyze the health status of the saw blade A of the bandsaw machine 20.

Afterward, the signal segmentation module 22 can execute the signal segmentation and extraction process 221 to partition each of the vibration signals 201, 202, 203 into four signal segments, wherein these signal segments may include one empty cutting segment (the saw blade A has yet to touch the workpiece) and three real cutting segments, and then the stable segment (e.g. the middle segment) of these real cutting segments will be extracted to serve as the feature segment.

The feature extraction module 23 can execute the feature extraction process 231 to process the frequency-domain of the feature segments extracted from the vibration signals 201, 202, 203. The feature extraction process 231 for frequency-domain may divide the whole frequency spectrum of each of the feature segments into several equal parts according to a predetermined value; for example, the frequency spectrum of the feature segment may be divided into several equal frequency spectrum segments on a 20 Hz basis; moreover, the feature extraction process 231 may further calculate the energy weight of each of the frequency spectrum segments as the frequency-domain signal features, as shown in Equation (1):

saw blade is seriously damaged, and 1 stands for the saw blade is healthy, as shown in Equation (3):

$$\text{Health status value} = 1 - R/0.45 \qquad (3);$$

In a preferred embodiment, the frequency-domain features, the time-domain features and other related conditions of the new saw blade A after it performs a machining operation each time can be stored in a database, and then the health status value 2511 of the new saw blade A performing a machining operation each time can be calculated by the above method, as shown in Table 1:

TABLE 1

| | | | Database format | | | | | | | | |
|---|---|---|---|---|---|---|---|---|---|---|---|
| | | Related machining conditions | | | | | | | Frequency-domain features and time-domain features | | |
| | | | | | | | | | Weight of the frequency spectrum segment 0-20 Hz | Weight of the frequency spectrum segment 20-40 Hz | |
| Machining time | Date and time | Machining time | Blade speed | Material width | ... | Root mean square | Kurtosis | Skewness | | | ... Health status value |
| 1 | xx | xx | xx | xx | xx | xx | xx | xx | xx | xx | xx xx |
| 2 | xx | xx | xx | xx | xx | xx | xx | xx | xx | xx | xx xx |
| ... | ... | ... | ... | ... | ... | ... | ... | ... | ... | ... | ... ... |

$$\text{Energy weight} = \text{Energy of a frequency spectrum segment/Total energy} \qquad (1);$$

Simultaneously, the feature extraction module 23 may also execute the feature extraction process 231 to process the time-domain of the feature segments extracted from the vibration signals 201, 202, 203. The feature extraction process 231 for time-domain may calculate the root mean square, the kurtosis and the skewness of each of the feature segments to serve as the time-domain signal features.

The feature selection module 24 may execute the feature selection process 241 to select a plurality of major signal features from the frequency-domain signal features and the time-domain signal features. The feature selection process 241 may calculate the correlation coefficient of each of the frequency-domain signal features and the time-domain signal features (Fi~Fn), as shown in Equation (2);

$$Ci = \text{correlation}(Fi, A) \qquad (2);$$

A is a monotonic increasing vector having the length the same with that of Fi; A=[1, 2, 3, ..., m], where m is the length of Fi. The feature selection module 24 may select 10 of the frequency-domain signal features and the time-domain signal features with higher correlation coefficient as the major signal features.

Figure 3:
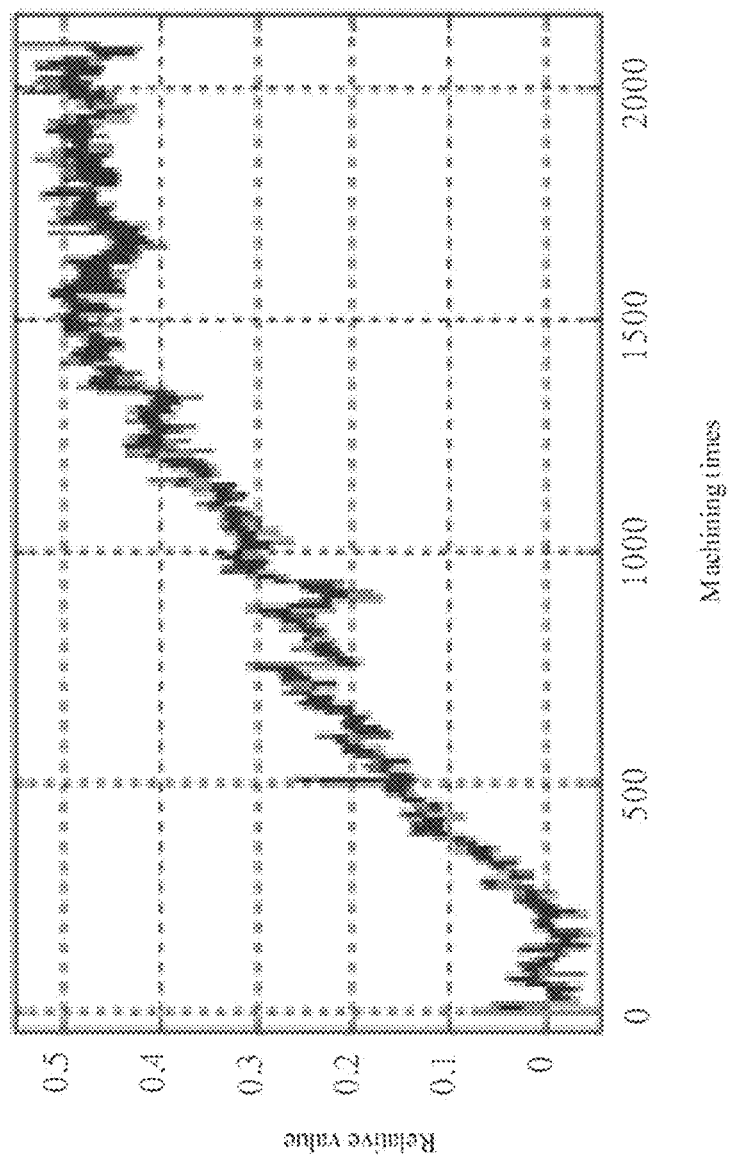
FIG. 3 is the first schematic view of the bandsaw machine health monitoring system of the first embodiment in accordance with the present invention.
Figure 4:
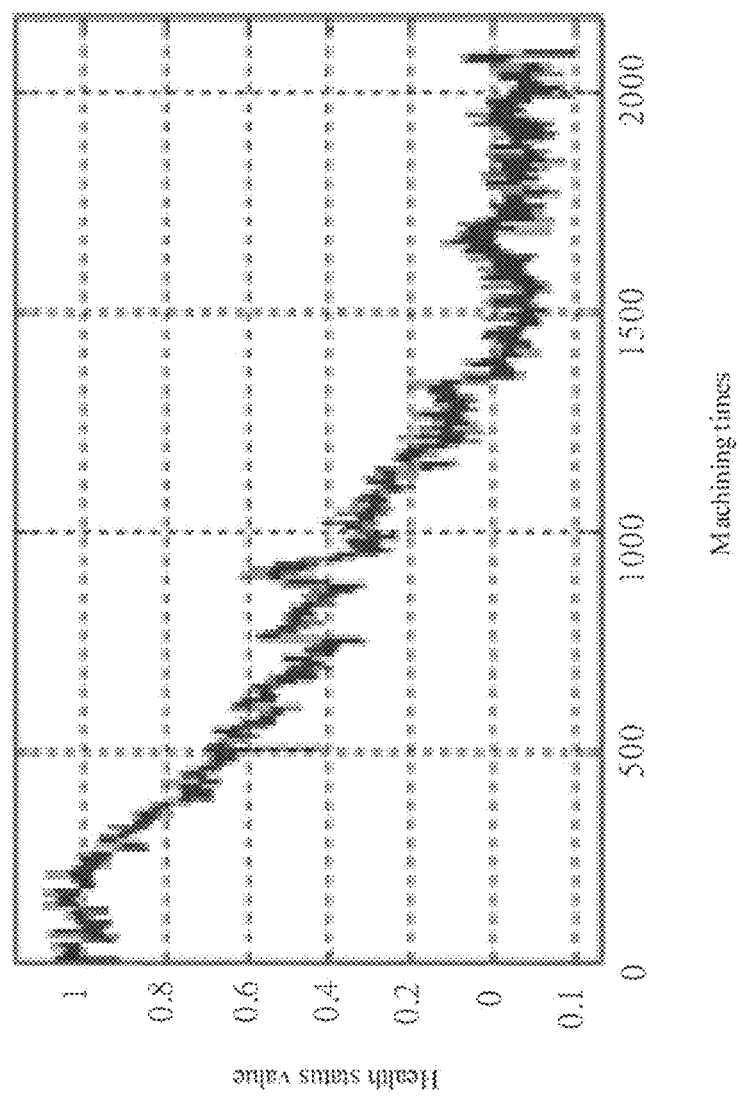
FIG. 4 is the second schematic view of the bandsaw machine health monitoring system of the first embodiment in accordance with the present invention.

Finally, the control module 25 can transfer the major signal features selected by the feature selection module 24 into the health status value 2511 of the saw blade A of the bandsaw machine 20 by means of the transferring process 251, and which will be displayed on the human-machine interface module 26. First, the transferring process 251 may transfer the above 10 major signal features into the relative values. For instance, regarding the major signal feature Fi, the transferring process 251 may calculate its initial value Ii=mean (the $5^{th}$~$50^{th}$ readings of Fi), and calculate its relative value Ri=(Fi−Ii)/Ii, and then calculate the mean value of the ten transferred major signal features R=mean (R1, R2, ..., R10). The transferring process 251 may use the logistic regression to transfer the above mean value R into the health status value 2511 (0~1), where 0 means the The relative value of the transferred major signal feature is as shown in FIG. 3, and the health status value 2511 calculated according to the above method is as shown in FIG. 4.

Figure 5:
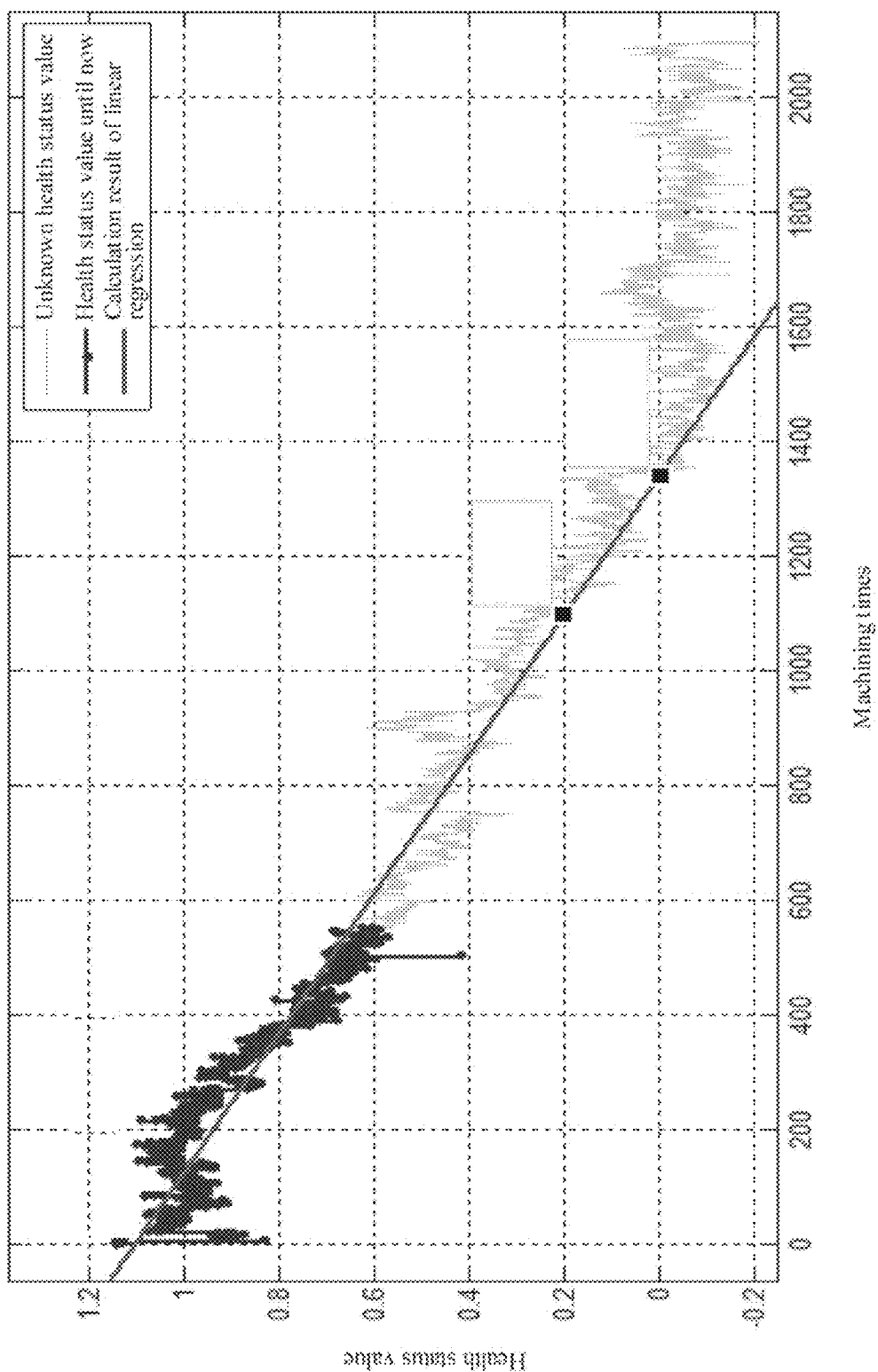
FIG. 5 is the third schematic view of the bandsaw machine health monitoring system of the first embodiment in accordance with the present invention.

As the deterioration process of a saw blade is linear; therefore, the control module 25 can further collect the health status value 2511 of the saw blade A after the saw blade A performs a machining operation each time, and then use the linear regression to establish the future health status estimation model for the purpose of anticipating the future health status of the saw blade A. For example, if the saw blade A has finished the $500^{th}$ machining operation, the health status values R[0-500] of the saw blade A from it performing the $1^{st}$ machining operation to the $500^{th}$ machining operation can be calculated according to the above method. Moreover, the future health status estimation model of the saw blade A can be acquired by using the linear regression to calculate R[0-500], as shown in FIG. 5. The calculation method is as shown in Equation (4):

$$\text{Health status value} = -0.00082 \ast \text{machining times} + 1.1 \qquad (4);$$

The control module 25 can further calculate the residual machining times of the saw blade A based on the future health status estimation model, as shown in Equation (5):

$$\text{Residual machining times} = (\text{Threshold value} - 1.1)/(-0.00082) - \text{Current machining times} \qquad (5);$$

The threshold value can be set according to the requirements of the user; in this way, the residual machining times of the saw blade A can be acquired by Equation (5). The forewarning module 27 can issue a forewarning signal 271 according to the health status value 2511, the future health status estimation model and the residual machining times so as to notify the user of the current health status of the saw blade A. For example, the forewarning module 27 can issue a forewarning signal 271 when the health status value 2511 of the saw blade A is lower than a health threshold or the residual machining times of the saw blade A is lower than a predetermined value in order to notify the user of the current health status of the saw blade A, such that the user can exactly control the timing to replace the saw blade A.

In another preferred embodiment, the above method can be used to analyze the sound signals of the bandsaw machine 20 when the bandsaw machine 20 is in operation in an attempt to estimate the health status value of the chip cleaning device of the handsaw machine 20, such as the wire brush.

In still another preferred embodiment, the time-domain signal features of the flow velocity signals, the saw blade-_tension signals, the pH value signals, the temperature signals, the turbidity signals, the pressure signals or the current signals of the handsaw machine 20 can be used to estimate the health status value of each component of the handsaw machine 20.

For example, the sensing module 21 can detect the handsaw machine 20 to acquire a plurality of flow velocity signals when the handsaw machine 20 is in operation in order to analyze the health status of the cutting fluid main pipe of the handsaw machine 20.

Next, the signal segmentation module 22 can execute the signal segmentation and extraction process 221 to respectively partition each of the flow velocity signals into four signal segments and then extract the stable segments therefrom as the feature segment, such as the middle segments.

Then, the feature extraction module 23 can execute the feature extraction process 231 to process the time-domain of the feature segments extracted from the flow velocity signals. Similarly, the feature extraction process 231 for time-domain may calculate the mean value, the kurtosis and the skewness of each of the feature segments to act as the time-domain signal features.

Afterward, the feature selection module 24 may calculate the correlation coefficient of each of the time-domain signal features and then select a predetermined number of the time-domain signal features with higher correlation coefficient as the major signal features. Finally, via the transferring process 251, the control module 25 may transfer the major signal features selected by the feature selection module 24 into the health status value 2511 of the cutting fluid main pipe of the handsaw machine 20.

As described above, by means of the above method, it is possible to analyze the time-domain signal features of the flow velocity signals, the saw blade tension signals, the pH value signals, the temperature signals, the turbidity signals, the pressure signals or the current signals of the handsaw machine 20 so as to estimate the health status value of each component of the handsaw machine 20. For instance, which may include the health status value 2511 of following components of the handsaw machine 20, including the gear box, such as the deceleration box, the cooling device, such as the cutting fluid and cutting fluid main pipe, the hydraulic device, such as the hydraulic pump, the hydraulic tank and the hydraulic oil, or power supply device, such as the motor, etc. Thus, the user can maintain the handsaw machine 20 based on the above health status values 2511.

In another preferred embodiment, the handsaw machine health monitoring system 2 can further monitor the usage status of the chip cleaning device of the handsaw machine 20 according to the sound signals. For instance, the handsaw machine health monitoring system 2 can determine whether the position of the wire brush of the handsaw machine 20 is proper or not; more specifically, the handsaw machine health monitoring system 2 can extract the feature frequencies and the magnitude features, etc., from the sound signals and then calculate the usage status value of the wire brush via similar method for the purpose of determining the position of the wire brush. In general, the wire brush should be disposed above the saw teeth of the saw blade and contact it in order to clean the chips over the saw teeth. Therefore, when the wire brush has worn away to a default value, such as ¼, the position of the wire brush should be adjusted. Through the above mechanism, the handsaw machine health monitoring system 2 is capable of effectively monitoring whether the wire brush of the handsaw machine 20 exactly contact the saw blade A or not, and notify the user of which by the forewarning module 27 for the user to adjust the position of the wire brush in time.

It is particularly noteworthy that there is, currently, no device capable of precisely estimate the health status of the saw blade of a handsaw machine for the user to determine the timing to replace it. However, the handsaw machine health monitoring system according to the present invention can not only estimate the health status value of the saw blade of the handsaw machine by detecting the operation status of the handsaw machine, but also can anticipate the residual machining times of the saw blade and then notify the user of which by a forewarning signal. Accordingly, the user can exactly know the residual service life of the saw blade, which can be the reference for the user to determine the timing to replace the saw blade. Similarly, the handsaw machine health monitoring system according to the present invention can perform the above management for other components of the bandsaw machine as well.

Besides, the bandsaw machine health monitoring system according to the present invention can further analyze the sound signals of the bandsaw machine to determine whether the position of the wire brush is correct and notify the user of which for the user to adjust the position of the wire brush in time to make it exactly contact the saw blade. Thus, the present invention definitely has an inventive step.

Figure 6:
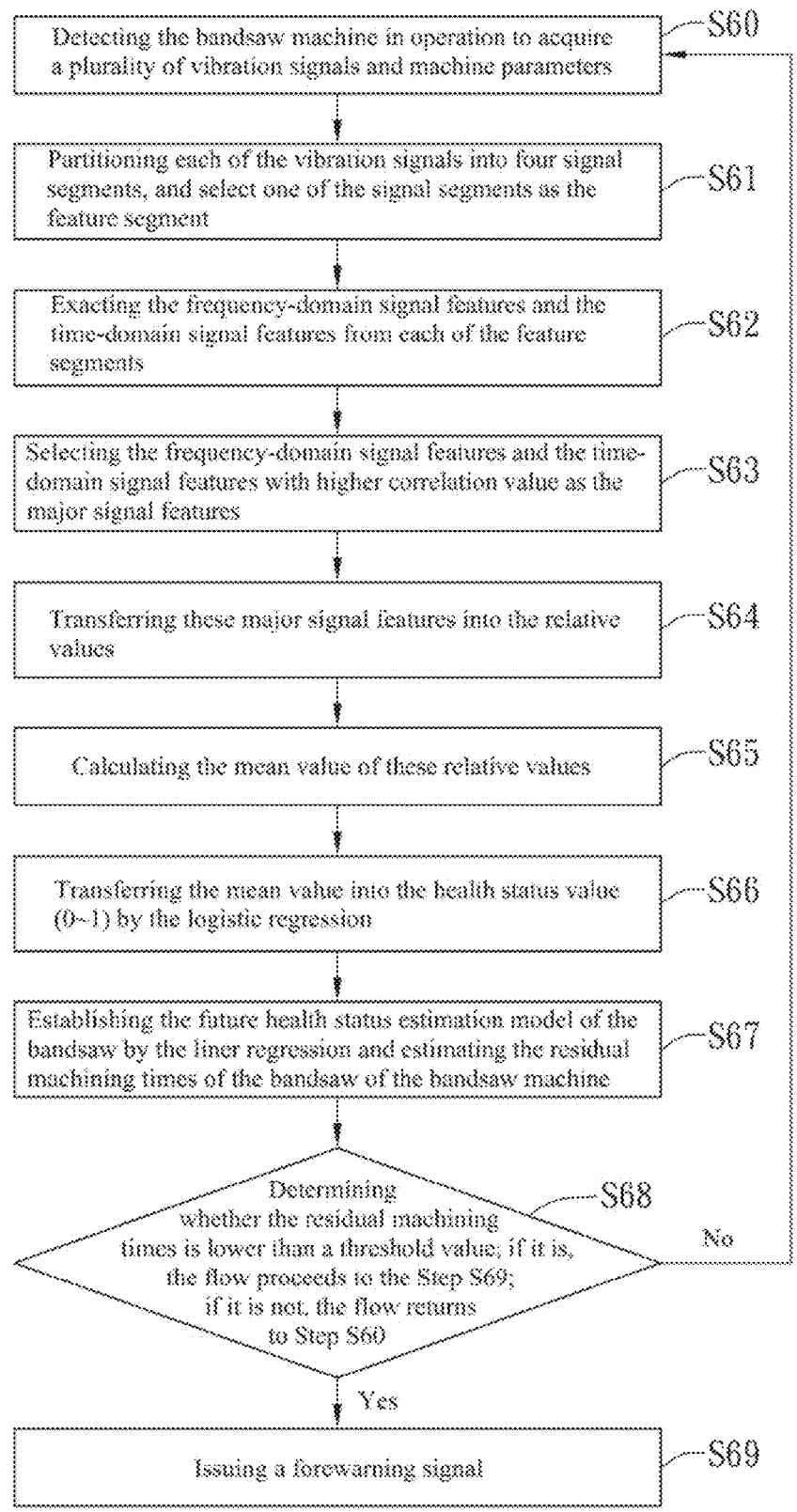
FIG. 6 is the flow chart of the bandsaw machine health monitoring system of the first embodiment in accordance with the present invention.

Please refer to FIG. 6, which is the flow chart of the bandsaw machine health monitoring system of the first embodiment in accordance with the present invention. The embodiment may include the following steps:

In Step S60: detecting the bandsaw machine in operation to acquire a plurality of vibration signals and machine parameters; then, the flow proceeds to Step S61.

In Step S61: partitioning each of the vibration signals into four signal segments, and select one of the signal segments as the feature segment; then, the flow proceeds to Step S62.

In Step S62: extracting the frequency-domain signal features and the time-domain signal features from each of the feature segments; then, the flow proceeds to Step S63.

In Step S63: selecting the frequency-domain signal features and the time-domain signal features with higher correlation value as the major signal features; then, the flow proceeds to Step S64.

In Step S64: transferring these major signal features into the relative values; then, the flow proceeds to Step S65.

In Step S65: calculating the mean value of these relative values; then, the flow proceeds to Step S66.

In Step S66: transferring the mean value into the health status value (0~1) by the logistic regression; then, the flow proceeds to Step S67.

In Step S67: establishing the future health status estimation model of the saw blade by the liner regression and estimating the residual machining times of the saw blade of the bandsaw machine; then, the flow proceeds to Step S68.

In Step S68: determining whether the residual machining times is lower than a threshold value; if it is, the flow proceeds to the Step S69; if it is not, the flow returns to Step S60.

In Step S69: issuing a forewarning signal.

Figure 7:
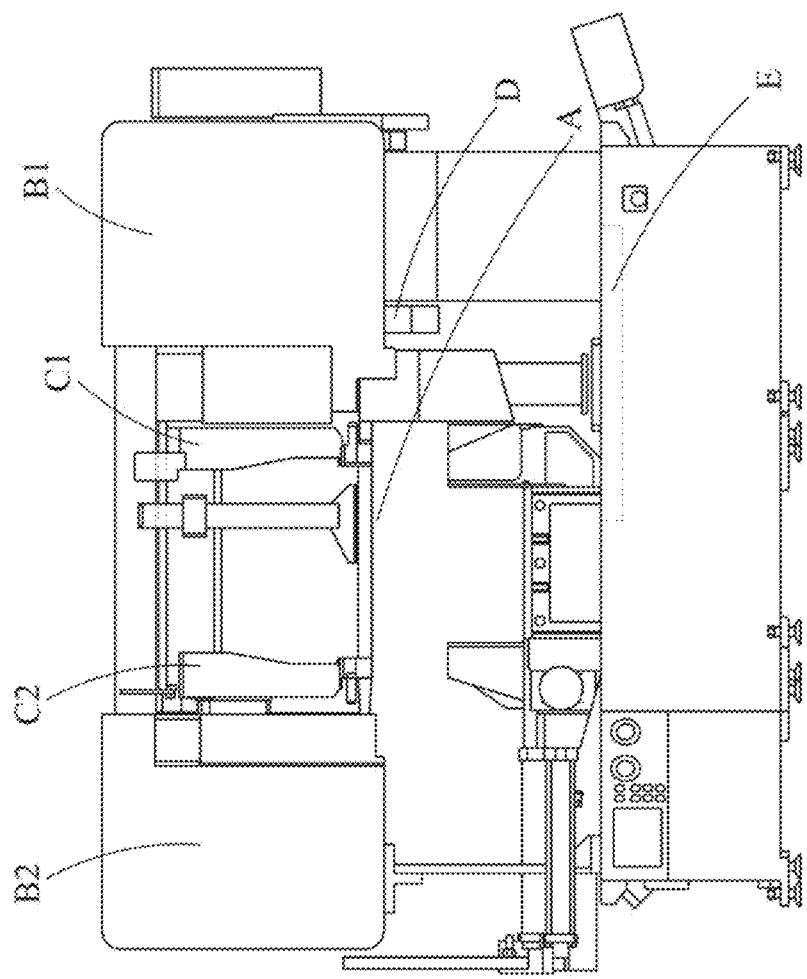
FIG. 7 is the schematic view of the bandsaw machine health monitoring system of the second embodiment in accordance with the present invention.

Please refer to FIG. 7, which is the schematic view of the handsaw machine health monitoring system of the second embodiment in accordance with the present invention. The embodiment illustrates the appropriate installation positions of the sensing devices of the sensing module of the handsaw machine health monitoring system.

In the embodiment, the handsaw machine health monitoring system may include a sensing module, a signal processing module, a human-machine interface module and a control module. The sensing module may include a plurality of sensing device, and the sensing devices may be used to collect a plurality of signals of the handsaw machine 70 when the handsaw machine 70 is in operation. The signal processing module may be electrically connected to the sensing module, and the signal processing module may receive the signals collected by the sensing module and then analyze the signals. The control module may receive, compare and analyze the processing result of the signal processing module. The human-machine interface module may receive the analysis result of the control module and display the health status value of the handsaw machine 70.

More specifically, the sensing devices of the sensing module may be disposed on specific positions of the handsaw machine 70 in order to reach the best performance. As shown in FIG. 7, the handsaw machine 70 may include a saw blade A, a first driving device B1, a second driving device B2, a first sliding device C1, a second sliding device C2, a chip cleaning device D and a first cutting fluid tank E. More specifically, the first driving device B1 may be the driving wheel, the second driving device B2 may be the driven wheel, the first sliding device C1 may be the right saw arm, the second sliding device C2 may be the left saw arm, and the chip cleaning device may be the wire brush. The two ends of the saw blade A may be respectively connected to the first driving device B1 and the second driving device B2; the saw blade A can slide toward the right side and the left side via the first sliding device C1 and the second sliding device C2. The sensing module of the handsaw machine health monitoring system may have a plurality of sensing devices, which can be installed on the specific monitoring positions for detecting various signals of the handsaw machine 70 when the handsaw machine 70 is in operation so as to perform further analysis.

The sensing devices of the sensing module may include the vibration sensing devices, which may be installed on the first sliding device C1 and the second sliding device C2 of the handsaw machine 70 for detecting the vibration signals of the saw blade A during the machining process. The vibration sensing device may be a uniaxial accelerometer or a triaxial accelerometer.

The sensing devices of the sensing module may include the sound sensing devices, and the sound sensing device may be a microphone. The top of the chip cleaning device D and the upper right side of the first driving device B1 may be respectively installed with a microphone to detect the sound signals generated during the chip cleaning device D is cleaning the chips on the saw blade A and the sound signals generated during the saw blade A contacts the first driving device B1.

The sensing devices of the sensing module may include the temperature sensing devices, and the temperature sensing device may be a resistance temperature detector (RTD), which can be installed around the deceleration box, inside the hydraulic tank of the handsaw machine or the place where the handsaw machine 70 is installed for measuring the temperature of the deceleration box, the temperature of the hydraulic oil and the environmental temperature, etc.

The sensing devices of the sensing module may include the flow velocity sensing devices, and the flow velocity sensing device may be a flowmeter, which may be installed on the cutting fluid main pipe of the cutting fluid tank E for monitoring the flow velocity signals of the cutting fluid main pipe. If too many chips accumulate in the cutting fluid tank E, the flow velocity of the cutting fluid will be slowed down and then the cutting fluid flow may be insufficient with the result that the chips cannot be completely cleaned during the machining process, so the saw blade may be damaged due to high temperature. Therefore, it is necessary to measure the flow velocity signals in order to ensure that the chips can be completely cleaned and avoid high temperature.

The sensing devices of the sensing module may include the pH value sensing devices for measuring the pH value signals of the cutting fluid to monitor the health status of the cutting fluid, and the pH value sensing device may be a pH meter and the like.

If the saw blade A of the bandsaw machine 70 is overloaded during the machining process, the load of the hydraulic motor will significantly increase; therefore, the sensing devices of the sensing module may further include the pressure sensing devices, which may be installed on the top of the hydraulic pump for measuring the machining pressure signals, where the pressure sensing device may be a pressure meter.

Furthermore, when the bandsaw machine 70 is overloaded, the motor should increase its power to keep the machining speed constant; however, excessive machining overload will decrease the service life of the saw blade A and make the cut surface of the workpiece unsmooth. Thus, the sensing devices of the sensing module may include a current sensing device for measuring the current signals outputted from the motor so as to perform further analysis.

As the quality of the hydraulic oil and the cutting fluid will also influence the machining result of the bandsaw machine 70 during the machining process; hence, the sensing devices of the sensing module may include a turbidity meter for periodically measure the turbidity signals of the hydraulic oil and the cutting fluid so as to perform further analysis.

As described above, the sensing devices of the sensing module may be respectively installed on the different positions in order to exactly measure the bandsaw machine's 70 sound signals, pressure signals, flow velocity signals, saw blade tension signals, pH value signals, temperature signals, turbidity signals or current signals, etc., in order to respectively estimate the health status of the bandsaw machine's saw blade, chip cleaning device, such the wire brush, the gear box, such as the deceleration box, the cooling device, such as the cutting fluid and cutting fluid main pipe, the hydraulic device, such as hydraulic pump, hydraulic tank and hydraulic oil, or power supply device, such as motor, etc. The above installation positions of the sensing devices are just for example instead of limitations; the installation positions of the sensing devices may be changed according to the actual requirements; the present invention is not limited thereto.

In summation of the description above, one embodiment of the present invention discloses a system able to transfer the signals detected from the bandsaw machine during the bandsaw machine is in operation into the health status value of the saw blade of the bandsaw machine by means of the signal segmentation process, the feature extraction process and the feature transferring process, etc. Therefore, the system allows the user to exactly know the abrasion level of the saw blade, so the user can control the timing to replace it, which is very convenient for the user.

Also, one embodiment of the present invention further establishes the future health status estimation model of the saw blade to estimate its residual machining times and then notify the user of which by a forewarning signal, which allows the user to exactly control the remaining service life and the usage status of the saw blade.

One embodiment of the present invention calculates the usage status value of the chip cleaning device of the bandsaw machine by analyzing the sound signals so as to determine the position of the chip cleaning device, which provides the user with the information about whether the chip cleaning device exactly contacts the saw blade or not in order to make sure the wire brush can work normally.

Besides, one embodiment of the present invention uses the above methods to provide the user with the information about the health statuses of other components of the bandsaw machine in addition to the saw blade, which can help the user more efficiently maintain the bandsaw machine and learn the overall health status of the bandsaw machine.

Moreover, one embodiment of the present invention extracts the frequency domain signal features by calculating the energy weight of each of the frequency spectrum segments; in this way, the measurement result will not be influenced by the machining parameters; therefore, the measurement result can be of higher precision.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A bandsaw machine health monitoring system, comprising: a sensing module, a signal processing module, a human-machine interface module and a control module;
the sensing module comprising a plurality of sensing devices, wherein the sensing devices are operable to collect a plurality of signals of a bandsaw machine when the bandsaw machine is in operation; the sensing devices include at least two sound sensing devices, and the sound sensing devices measure sound signals generated during a chip cleaning device is cleaning chips and when a saw blade of the bandsaw machine contacts a first driving device of the bandsaw machine;
the signal processing module being electrically connected to the sensing module, wherein the signal processing module is operable to receive the signals collected by the sensing module and analyze the signals;
the control module being operable to receive, compare and analyze a processing result of the signal processing module; and
the human-machine interface module being operable to receive an analysis result of the control module and display a health status value of the bandsaw machine.

2. The system of claim 1, wherein the sensing module further comprises at least one vibration sensing device, and the vibration sensing device is installed on a first sliding device and a second sliding device of the bandsaw machine in order to measure a vibration signal generated during the saw blade of the bandsaw machine is performing a machining operation.

3. The system of claim 1, wherein the sound sensing devices are respectively installed on a top of the chip cleaning device and on an upper right side of the first driving device of the bandsaw machine.

4. The system of claim 1, wherein the sensing module further comprises a plurality of temperature sensing devices, and the temperature sensing devices are respectively installed outside a gear box of the bandsaw machine, and inside a hydraulic tank of a hydraulic device of the bandsaw machine in order to measure temperatures of the gear box and the hydraulic tank.

5. The system of claim 1, wherein the sensing module further comprises a flow velocity sensing device, and the flow velocity sensing device is installed on a cutting fluid main pipe of a cooling device of the bandsaw machine in order to monitor a flow velocity of the cutting fluid main pipe.

6. The system of claim 1, wherein the sensing module further comprises a pressure sensing device, and the pressure sensing device is installed on a hydraulic pump of a hydraulic device of the bandsaw machine in order to measure a machining pressure signal.

7. The system of claim 1, wherein the health status value stands for a health status of the saw blade of the bandsaw machine.

8. The system of claim 1, wherein the health status value stands for a health status of the chip cleaning device of the bandsaw machine.

9. The system of claim 1, wherein the health status value stands for a health status of a gear box, a cooling device, a hydraulic device, or a power supply device.

10. The system of claim 1, wherein the signal processing module comprises a signal segmentation module, a feature extraction module and a feature selection module; the signal segmentation module partitions each of the signals collected by the sensing devices into a plurality of signal segments, and extracts one of the signal segments as a feature segment; then the feature extraction module extracts a plurality of signal features from the feature segments, and the feature selection module selects a plurality of major signal features from the signal features.

11. The system of claim 10, wherein the signal segmentation module partitions each of the signals into a plurality of signal segments, and the signal segments comprise at least one empty cutting segment and at least one real cutting segment; the signal segmentation module extracts stable segments from the signal segments as the feature segments.

12. The system of claim 10, wherein the signal features comprise a plurality of time-domain signal features and a plurality of frequency-domain features.

13. The system of claim 12, wherein the feature extraction module partitions a frequency spectrum of each of the feature segments into a plurality of frequency spectrum segments, and then calculate an energy weight of each of the frequency spectrum segments to generate the frequency-domain features.

14. The system of claim 13, wherein the feature selection module calculates a correlation coefficient of each of the frequency-domain features and a correlation coefficient of each of the time-domain features, and then select a predetermined number of the time-domain signal features and frequency-domain features with higher correlation coefficients as the major signal features.

15. A bandsaw machine health monitoring system, comprising: a sensing module, a signal processing module, a human-machine interface module and a control module;
the sensing module comprising a plurality of sensing devices, wherein the sensing devices are operable to collect a plurality of signals during a bandsaw machine is in operation; the sensing devices include at least two sound sensing devices, and the sound sensing devices measure sound signals generated during a chip cleaning device is cleaning chips and when a saw blade of the bandsaw machine contacts a first driving device of the bandsaw machine;

the signal processing module being electrically connected to the sensing module, wherein the signal processing module comprises a signal segmentation module, a feature extraction module and a feature selection module; the signal segmentation module partitions each of the signals collected by the sensing devices into a plurality of signal segments, and extracts one of the signal segments as a feature segment; then the feature extraction module extracts a plurality of signal features from the feature segments, and the feature selection module selects a plurality of major signal features from the signal features;

the control module being operable to receive the major signal features and perform a transferring process to transfer the major signal features selected by the feature selection module into the health status value of the bandsaw machine; and a human-machine interface module being operable to receive the health status value from the control module and then display the health status value.

16. The system of claim 15, wherein the control module collects the health status value of the saw blade of the bandsaw machine after the bandsaw machine performs a machining operation each time, and then establishes a future health status estimation model by means of linear regression according to the health status values.

17. The system of claim 16, wherein the control module further calculates residual machining times of the saw blade according to the future health status estimation model.

18. The system of claim 17, further comprising a forewarning module operable to issue a forewarning signal according to the residual machining times of the future health status estimation model.

19. The system of claim 18, wherein the signals further comprise one or more of a flow velocity signal, a saw blade tension signal, a pH value signal, a pressure signal, a temperature signal, a turbidity signal and a current signal.

20. The system of claim 15, wherein the signals are sound signals; the control module transfers the major signal features into a usage status value of the chip cleaning device of the bandsaw machine by means of the transferring process in order to determine a position of the chip cleaning device.

* * * * *